United States Patent
Wells et al.

(10) Patent No.: US 11,060,380 B2
(45) Date of Patent: Jul. 13, 2021

(54) SYSTEMS AND METHODS FOR ACCESSING SUBSEA CONDUITS

(71) Applicant: BP Corporation North America, Inc., Houston, TX (US)

(72) Inventors: Shane Wells, Brookshire, TX (US); Ronald K. Berger, Houston, TX (US); James Longville, Houston, TX (US)

(73) Assignee: BP Corporation North America, Inc., Houston, TX (US)

( * ) Notice: Subject to any disclaimer, the term of this patent is extended or adjusted under 35 U.S.C. 154(b) by 0 days.

(21) Appl. No.: 16/701,883

(22) Filed: Dec. 3, 2019

(65) Prior Publication Data

US 2020/0173257 A1    Jun. 4, 2020

Related U.S. Application Data

(60) Provisional application No. 62/774,697, filed on Dec. 3, 2018.

(51) Int. Cl.
*E21B 19/22* (2006.01)
*E21B 19/24* (2006.01)
*E21B 37/06* (2006.01)

(52) U.S. Cl.
CPC .............. *E21B 37/06* (2013.01); *E21B 19/22* (2013.01); *E21B 19/24* (2013.01)

(58) Field of Classification Search
CPC ........... E21B 19/22; E21B 19/24; E21B 37/06
See application file for complete search history.

(56) References Cited

U.S. PATENT DOCUMENTS

| | | | | |
|---|---|---|---|---|
| 5,778,981 A | * | 7/1998 | Head | E21B 17/01 166/345 |
| 6,200,068 B1 | | 3/2001 | Bath et al. | |
| 6,834,724 B2 | * | 12/2004 | Headworth | E21B 17/01 166/384 |
| 6,869,253 B2 | * | 3/2005 | Biolley | E21B 17/015 405/224.3 |
| 7,690,135 B2 | * | 4/2010 | Yu | E21C 50/00 37/314 |
| 7,784,201 B2 | * | 8/2010 | Yu | E02F 3/907 37/314 |

(Continued)

FOREIGN PATENT DOCUMENTS

| | | |
|---|---|---|
| EP | 2372206 A1 | 10/2011 |
| EP | 3411557 A1 | 12/2018 |

(Continued)

OTHER PUBLICATIONS

International Search Report and Written Opinion dated Mar. 6, 2020, for PCT/US2019/064222, filed on Dec. 3, 2019.

(Continued)

*Primary Examiner* — Matthew R Buck
(74) *Attorney, Agent, or Firm* — Conley Rose, P.C.

(57) ABSTRACT

A system for remediating a blockage in a subsea component including a riser extending from a surface vessel, a flexible jumper having an upper end coupled to the riser and a lower end coupled to a subsea component, and a surface system disposed on the surface vessel and including flexible tubing configured to be inserted and advanced through the tubular string and flexible jumper to the blockage.

30 Claims, 6 Drawing Sheets

(56) References Cited

U.S. PATENT DOCUMENTS

| | | | | |
|---|---|---|---|---|
| 7,793,723 | B2* | 9/2010 | Vedeld | B63B 27/24 |
| | | | | 166/355 |
| 7,798,232 | B2* | 9/2010 | Headworth | E21B 33/038 |
| | | | | 166/352 |
| 8,657,531 | B2* | 2/2014 | Rios | E21B 19/008 |
| | | | | 405/169 |
| 9,714,727 | B2* | 7/2017 | Tan | F16L 3/26 |
| 9,797,223 | B1* | 10/2017 | Gordon | E21B 37/10 |
| 10,273,785 | B2* | 4/2019 | Older | E21B 43/01 |
| 10,458,235 | B2* | 10/2019 | Halkyard | E02F 3/9262 |
| 2003/0056954 | A1 | 3/2003 | Headworth | |
| 2004/0163817 | A1* | 8/2004 | Horton, III | E21B 17/085 |
| | | | | 166/367 |
| 2010/0018693 | A1* | 1/2010 | Duncan | E21B 37/00 |
| | | | | 166/77.2 |
| 2010/0212754 | A1 | 8/2010 | Ayers et al. | |
| 2015/0060079 | A1* | 3/2015 | Clements | E21B 17/015 |
| | | | | 166/350 |
| 2015/0136409 | A1* | 5/2015 | Hall | E21B 33/0355 |
| | | | | 166/344 |
| 2019/0345780 | A1* | 11/2019 | Almerico | E21B 33/064 |

FOREIGN PATENT DOCUMENTS

| | | |
|---|---|---|
| GB | 2457081 A | 8/2009 |
| WO | 200060262 A1 | 10/2000 |
| WO | 20160120624 A3 | 8/2016 |

OTHER PUBLICATIONS

International Search Report and Written Opinion dated Oct. 12, 2020 for PCT/US2020/043100 filed on Jul. 22, 2020.
International Search Report and Written Opinion dated Oct. 12, 2020 for PCT/US2020/043094 filed on Jul. 22, 2020.

* cited by examiner

SYSTEMS AND METHODS FOR ACCESSING SUBSEA CONDUITS

CROSS-REFERENCE TO RELATED APPLICATIONS

The present application claims benefit of U.S. provisional patent application No. 62/774,697 filed Dec. 3, 2018, and entitled "Systems and Methods for Accessing Subsea Conduits" which is incorporated herein by reference in its entirety.

STATEMENT REGARDING FEDERALLY SPONSORED RESEARCH OR DEVELOPMENT

Not applicable.

BACKGROUND

Offshore systems for drilling and/or producing hydrocarbons in offshore environments typically include a disposed at the waterline (e.g., a drilling and/or production platform), one or more wellbores extending from the seabed into an earthen formation, components disposed at the seabed and coupled to the wellbores (e.g., a subsea tree, template, manifold, pipeline, and pipeline end termination (PLET), etc.), and flowlines extending from the surface to the seabed components (e.g., a riser system, umbilical, drill string, etc.). From time to time, blockages may arise in one or more flow passages in the offshore system such as in the components disposed at the seabed. Such blockages may result from asphaltene, natural gas hydrates, or sand or scale.

SUMMARY

An embodiment of a system for remediating a blockage in a subsea component comprises a riser extending from a surface vessel, a flexible jumper having an upper end coupled to the riser and a lower end coupled to a subsea component, and a surface system disposed on the surface vessel and including flexible tubing configured to be inserted and advanced through the tubular string and flexible jumper to the blockage. In some embodiments, the surface system comprises a tubing guide assembly coupled to the flexible tubing and configured to retract the flexible tubing from the riser. In some embodiments, the surface system comprises an injection fluid pump configured to pump fluid through the flexible tubing. In certain embodiments, the system comprises a disconnect assembly coupling the lower end of the flexible jumper to the subsea component, wherein the disconnect assembly is configured to sever the flexible tubing when the flexible tubing is positioned in the disconnect assembly. In certain embodiments, the system comprises a buoyancy module coupled to the flexible jumper at a first location along the flexible jumper and a weight coupled to the flexible jumper at a second location along the flexible jumper, wherein the second location is laterally spaced from the first location. In some embodiments, the flexible jumper is arranged in an S-shape including a first linear section extending vertically from the upper end, a first curved section extending from the linear section, a second linear section extending from the first curved section, and a second curved section extending from the second linear section. In some embodiments, the first curved section has an upper side that is concave and a lower side that is convex, and wherein the second curved section has an upper side that is convex and a lower side that is concave. In certain embodiments, the second linear section is oriented at an acute angle relative to horizontal. In certain embodiments, the acute angle is 7° to 13°. In some embodiments, the first curved section extends through a first bend angle of 90° to 110°, and wherein the second curved section extends through a second bend of 90° to 110°. In some embodiments, the first curved section has a first radius of curvature and the second curved section has a second radius of curvature that is less than the first radius of curvature. In certain embodiments, the first radius of curvature is 15.0 meters to 23.0 meters and the second radius of curvature is 3.0 meters to 7.0 meters.

An embodiment of a system for remediating a blockage in a subsea component comprises a flexible jumper having an upper end coupled to a conduit extending from the surface and a second end coupled to a subsea terminal disposed at the sea floor, a buoyancy module coupled to the flexible jumper, a weight coupled to the flexible jumper, wherein the flexible jumper includes a first linear section extending vertically from the upper end, a first curved section extending from the linear section, a second linear section extending from the first curved section, and a second curved section extending from the second linear section, wherein the weight is coupled to the first curved section proximal the second linear section and the buoyancy module is coupled to the second curved section proximal the second linear section. In some embodiments, the first curved section has an upper side that is concave and a lower side that is convex, and wherein the second curved section has an upper side that is convex and a lower side that is concave. In some embodiments, the second linear section is oriented at an acute angle relative to horizontal. In certain embodiments, the acute angle is 7° to 13°. In some embodiments, the first curved section extends through a first bend angle of 90° to 110°, and wherein the second curved section extends through a second bend of 90° to 110°. In some embodiments, the first curved section has a first radius of curvature and the second curved section has a second radius of curvature that is less than the first radius of curvature. In some embodiments, the first radius of curvature is 15.0 meters to 23.0 meters and the second radius of curvature is 3.0 meters to 7.0 meters.

An embodiment of a method for remediating a blockage in a subsea component comprises (a) suspending a riser from a surface vessel, (b) coupling an upper end of a flexible jumper to a lower end of the riser, (c) coupling a lower end of the flexible jumper to the subsea component, (d) advancing a flexible tubing from the surface vessel through the riser and the flexible jumper, (e) pumping an injection fluid into a first end of the flexible tubing on the surface vessel and flowing the injection fluid through the flexible tubing, and (f) ejecting the injection fluid from a second end of the flexible tubing proximal the blockage to remove the blockage. In some embodiments, (f) comprises jetting the blockage with the injection fluid to break up the blockage. In some embodiments, (f) comprises dissolving the blockage with the injection fluid. In certain embodiments, the method comprises coupling a buoyancy module to the flexible jumper and coupling a weight to the flexible jumper to arrange the flexible jumper in an S-shape. In certain embodiments, the buoyancy module is coupled to the flexible jumper at a first location and the weight is coupled to the flexible jumper at a second location that is laterally spaced from the first location. In some embodiments, the flexible jumper includes a first linear section extending vertically from the upper end, a first curved section extending from the linear section, a second linear section extending from the first curved section, and a second curved section extending from the second linear section, wherein the first curved section has an upper side that is concave and a lower side that is convex, and wherein the second curved section has an upper side that is convex and a lower side that is concave. In some embodiments, the second linear section is oriented at an acute angle relative to horizontal. In certain embodiments, the acute angle is 7° to 13°. In certain embodiments, the first curved section extends through a first bend angle of 90° to 110°, and wherein the second curved section extends through a second bend of 90° to 110°. In some embodiments, the first curved section has a first radius of curvature and the second curved section has a second radius of curvature that is less than the first radius of curvature. In some embodiments, the first radius of curvature is 15.0 meters to 23.0 meters and the second radius of curvature is 3.0 meters to 7.0 meters.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
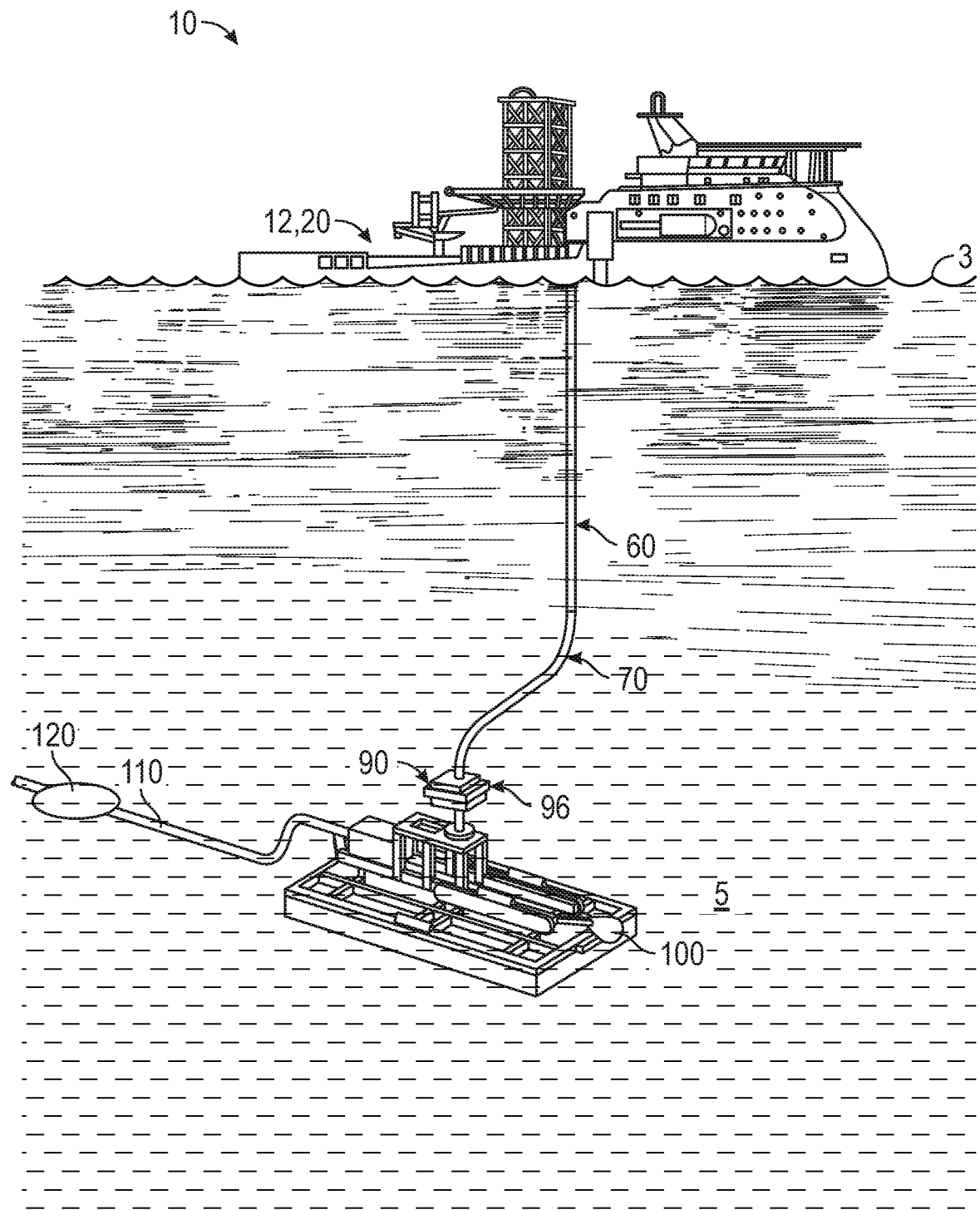
FIG. 1 is a perspective view of an embodiment of an offshore intervention system in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment. Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As previously described, blockages may arise in one or more flow passages in offshore drilling and production systems. Such blockages can undesirably restrict the flow of fluids through the flow passages, and in some extreme cases, completely block the flow of fluids through the flow passages. Embodiments described herein are directed to systems and methods for removing and/or remediating blockages formed in subsea flow passages to enhance fluid flow therethrough during drilling and/or production operations.

Figure 2:
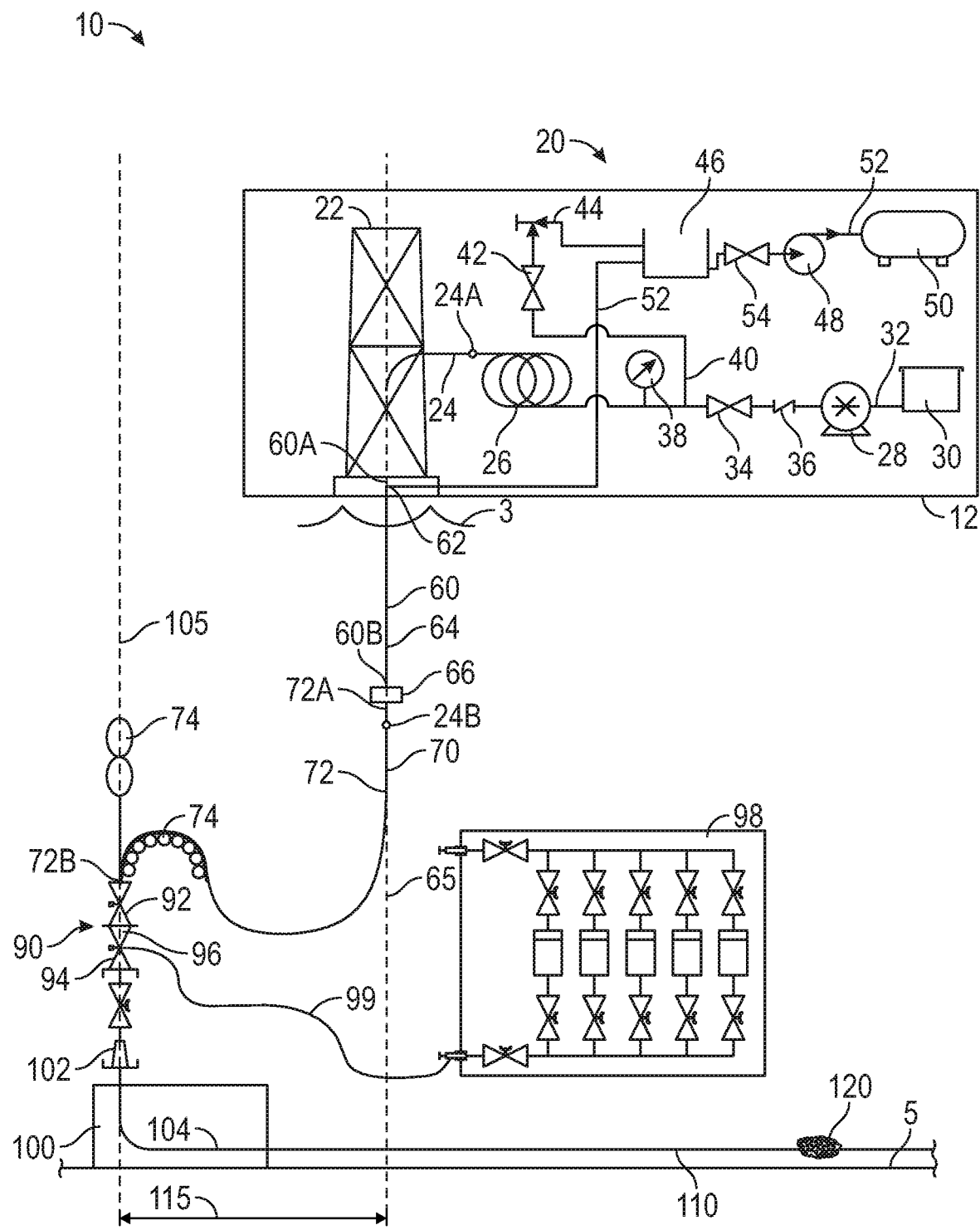
FIG. 2 is a schematic view of the intervention system of FIG. 1.

Referring to FIGS. 1 and 2, an embodiment of an offshore intervention or remediation system 10 is shown. In general, system 10 is releasably coupled to a subsea terminal 100 to remediate and/or remove a blockage 120 disposed in a subsea component 110. In this embodiment, subsea component 110 is a subsea flowline or conduit extending from terminal 100, and thus, may also be referred to as conduit 110. In FIG. 1, terminal 100 is shown as a pipeline end termination (PLET), however, in general system 10 can be used in connection with a subsea PLET, subsea pipeline end manifold (PLEM), subsea manifold, a subsea BOP, or any other subsea structure coupled to a subsea conduit that includes a blockage.

In this embodiment, system 10 generally includes a surface system 20 disposed on surface vessel 12, a rigid riser 60 coupled to system 20 and extending subsea from vessel 12, a flexible conduit or jumper assembly 70 coupled to the lower end of riser 60, and a disconnect assembly 90 removably coupling jumper assembly 70 (and hence system 10) to subsea terminal 100. Surface vessel 12 is positioned at the surface 3, terminal 100 and flowline 110 are positioned at or proximal the sea floor 5, and riser 60, jumper assembly 70, and disconnect assembly 90 provide fluid communication between system 20 disposed on vessel 12 and terminal 100, as well as conduit 110 extending therefrom. In this embodiment, surface vessel 12 comprises a ship (e.g., a drilling or production ship), however, in other embodiments, surface vessel 12 may comprise a floating or semi-submersible platform.

As best shown in FIG. 2, in this embodiment, surface system 20 generally includes a derrick 22, throughbore tooling 24, a tubing guide assembly 26, an injection fluid pump 28, an injection fluid tank 30, a process fluid reservoir or tank 46, a process fluid pump 48, and a process fluid system 50. Derrick 22 is supports riser 60 and assists in the running of riser 60 to and from surface vessel 12. In this embodiment, throughbore tooling 24 comprises flexible tubing 24. Particularly, in this embodiment, flexible tubing 24 comprises coiled tubing that is extendable and retractable through riser 60, jumper assembly 70, disconnect assembly 90, terminal 100, and conduit 110. Guide assembly 26 facilitates the guidance of flexible tubing 24 into riser 60 and through riser 60, jumper assembly 70, disconnect assembly 90, terminal 100, and flowline 110, and the retraction of flexible tubing from riser 60, jumper assembly 70, disconnect assembly 90, terminal 100, and flowline 110. In this embodiment, flexible tubing 24 is Flexi-Coil produced by Paradigm Flow Services located at Ambachtsweg 7, 2964 LG Groot-Ammers, The Netherlands. In other embodiments, the flexible tubing 24 may comprise other forms of flexible or coiled tubing known in the art. For example, in some embodiments flexible tubing 24 may comprise wireline that may be lowered into a subsea wellbore extending beneath the sea floor 5.

Referring still to FIG. 2, flexible tubing 24 is coupled to guide assembly 26 and includes a first or upstream end 24A and a second or downstream end 24B opposite end 24A. Upstream end 24A is in fluid communication with an injection conduit 32 extending from injection fluid tank 30. Injection fluid pump 28 is disposed along injection conduit 32 and pumps an injection fluid from tank 30 through conduit 32 and flexible tubing 24. In this embodiment, an injection valve 34 for selectively isolating injection fluid pump 28 from flexible tubing 24, check valve 36 only permitting fluid flow in the direction away from injection fluid pump 28, and a pressure sensor or gauge 38 are also disposed along injection conduit 32.

As noted above, in this embodiment, flexible tubing 24 is Flexi-Coil, which includes a fluid jet assembly at downstream end 24B. The jet assembly includes one or more fluid jets configured to provide a locomotive force to the flexible tubing 24 to propel (pull or push from end 24B) flexible tubing 24 through riser 60, jumper assembly 70, disconnect assembly 90, terminal 100, and flowline 110; and one or more fluid jets configured to deliver and/or direct fluids at blockages (e.g., blockage 120) in a flow passage to drill, erode, dissolve, or otherwise remove the blockages. The fluid supplied to the fluid jet assembly at end 24B for locomotion and blockage removal is pumped via injection pump 28 from tank 30 through conduit 32 and flexible tubing 24 to end 24B. In general, the fluid supplied to end 24B from tank 30 via injection fluid pump 28 may comprise chemically treated sea water, brine, hydrocarbons, chemicals for dissolving a blockage (e.g., methanol, mono-ethylene glycol, aromatics such as xylene, toluene, etc., acid and the like), etc.

Referring still to FIG. 2, a process fluid conduit 52 extends from a port 62 formed in the riser 60 to process fluid system 50. Process fluid reservoir 46 and process fluid pump 48 are disposed along conduit 52. Process fluid conduit 52 is in fluid communication with riser 60 via port 62. When flexible tubing 24 is inserted into riser 60, as shown schematically in FIG. 2, process fluid conduit 52 in fluid communication with an annulus 64 formed between the outer surface of flexible tubing 24 and the inner surface of riser 60. During an intervention or blockage removal operation, injection fluids are emitted from end 24B of flexible tubing 24 into riser 60, jumper assembly 70, disconnect assembly 90, terminal 100, and conduit 110. The injection fluids emitted by flexible tubing 24 and any other fluids within riser 60, jumper assembly 70, disconnect assembly 90, terminal 100, and conduit 110 return to vessel 12 via the annulus 64 between riser 60 and flexible tubing 24, which may collectively be referred to herein as "process fluid," pass through port 62 into conduit 52. The process fluids are then delivered by conduit 52 to reservoir 46, and then from reservoir 46 to process fluid system 50 via conduit 52 and pump 48. Process fluid system 50 includes equipment for processing fluids. Reservoir 46 may temporarily store the process fluids as they are routed to system 50. A process valve 54 is disposed along process fluid conduit 52 for selectively isolating control fluid pump 48 from process fluid tank 46.

In this embodiment, surface system 20 also includes a crossover conduit 40 extending between injection conduit 32 and process fluid reservoir 46. A crossover valve 42 for isolating process fluid reservoir 46 from injection conduit 32, and a pressure relief valve (PRV) 44 for selectively relieving fluid pressure (e.g., at a predetermined threshold pressure) in crossover conduit 40 are disposed along crossover conduit 40. Riser 60 extends along a longitudinal or central axis 65 and comprises a first or upper end 60A suspended from surface vessel 12 and a second or lower end 60B coupled to jumper assembly 70 via a connector 66. In this embodiment, riser 60 comprises a drill string 60 formed from a plurality of drill pipe joints coupled end-to-end; however, in other embodiments, riser 60 may comprise other tubular strings or members known in the art.

Referring again to FIGS. 1-3, jumper assembly 70 generally includes a flexible jumper 72, one or more buoyancy modules 74 coupled to jumper 72, and a weight assembly 76 coupled to jumper 72. Flexible jumper 72 is a flexible, cylindrical conduit having a first or upper end 72A coupled to the lower end 60B of riser 60 via a connector 66 and a second or lower end 72B coupled to terminal 100 via disconnect assembly 90. Jumper 72 is generally configured to enable throughbore, subsea mechanical interventions to be performed from vessel 12. In this embodiment, jumper 72 is a Coflexip® flexible pipe hose commercially available from TechnipFMC plc; however, in general, the jumper (e.g., jumper 72) can be any suitable flexible hose or conduit known in the art such as composite pipe, flexible pipe, high pressure rubber hose, etc. In this embodiment, jumper 72 comprises a single or one-piece jumper 72; however, in other embodiments, jumper 72 may comprise multiple flexible jumpers assembled end-to-end. Buoyancy modules 74 of jumper assembly 70 apply a buoyant or upwardly directed (i.e., directed towards water line 3) force at one or more predetermined locations along jumper 72 while weight assembly 76 applies a weight or downwardly directed (i.e., directed towards sea floor 5) force at one or more predetermined locations along jumper 72. In this embodiment, weight assembly 76 includes a weight 78 seated on the sea floor 5 and a tension cable 80 extending from weight 78 and jumper 72. In other embodiments, weight assembly 76 may comprise other structures or devices for applying a downwardly directed force against jumper 72. In this arrangement, buoyancy modules 74 are coupled to flexible jumper 72 at a first location along flexible jumper 72 and weight 78 is coupled to flexible jumper 72 at a second location along flexible jumper 72 that is spaced from the first location to achieve a geometry for jumper 72 that allows relative movement between vessel 12 and terminal 100, while simultaneously minimizing the total angle of the bends in jumper 72.

As best shown in FIG. 2, disconnect assembly 90 is an emergency disconnect package (EDP) for: (i) severing the fluid connection between jumper 72 and terminal 100, (ii) isolating terminal 100 from the surrounding environment (e.g., the sea water surrounding terminal 100), and (iii) isolating jumper 72 from the surrounding environment. In this embodiment, disconnect assembly 90 generally includes a first or upper valve 92 disposed at lower end 72B of jumper 72, a second or lower valve 94 disposed on terminal 100, and a cutter 96 positioned between valves 92, 94. Upper valve 92 can be closed to isolate jumper 72 from the surrounding environment when jumper 72 is disconnected from valve 94 and terminal 100, and lower valve 94 can be closed position to isolate terminal 100 from the surrounding environment when jumper 72 is disconnected from valve 94 and terminal 100. Cutter 96 is configured cut or sever any tools or equipment extending through disconnect assembly 90 to permit the isolation of flexible jumper 72 and terminal 100 from the surrounding environment when valves 92, 94 are decoupled. For example, cutter 96 can sever flexible tubing 24 extending through disconnect assembly 90 when necessary to allow isolation of flexible jumper 72 and terminal 100. In some embodiments, the upper portion of flexible tubing 24 positioned in flexible jumper 72 may be retrieved to surface following the cutting of tubing 24 by cutter 96, while the lower portion of the severed tubing 24 disposed in terminal 100 may be retrieved at a later time via a fishing tool lowered through jumper 72 (e.g., a fishing tool connected to an end of flexible tubing that is extended through jumper 72).

Referring still to FIG. 2, in this embodiment, an accumulator skid 98 positioned at or proximal sea floor 5 is coupled to disconnect assembly 90 via an umbilical 99 extending therebetween. Accumulator skid 98 includes one or more accumulators for selectively and independently actuating cutter 96 and closing valves 92, 94 in response to a threshold tensile force applied to disconnect assembly 90. Thus, in this embodiment, disconnect assembly 90 is passive EDP that actuates to isolate flexible jumper 72 and terminal 100 in response to a predetermined tensile force applied to assembly 90. In other embodiments, the disconnected assembly (e.g., disconnect assembly 90) may be an active EDP that is actuated in response to a command provided by operators of the intervention system (e.g., system 10) via a wired (e.g., an umbilical) or wireless (e.g., acoustic transmission, etc.) connection. In still other embodiments, the disconnect assembly may be actuated in response to an algorithm that receives data corresponding to the position and movement of the surface vessel (e.g., surface vessel 12) relative to the subsea terminal (e.g., terminal 100).

Terminal 100 is positioned at or proximal the sea floor 5 and generally includes a connector assembly 102 for coupling terminal 100 to disconnect assembly 90 and an internal fluid conduit 104 extending from assembly 102. Connector assembly 102 is disposed at one end of conduit 104 and the opposite end of conduit 104 is coupled to conduit 110. Thus, conduits 104, 110 are in fluid communication. In this embodiment, conduit 104 includes a 90° bend between connector assembly 102, which extends vertically upward from terminal 100 along a longitudinal or central axis 105, and conduit 110, which is oriented horizontal (or substantially horizontal).

In this embodiment, disconnect assembly 90 is coupled to connector 102 of terminal 100, and thus, is also positioned proximal sea floor 5. In this embodiment, conduit 110 is a production pipeline that transports production fluids (e.g., hydrocarbons) from one or more subsea wells to terminal 100. As described above, blockages may form in various subsea conduits and flow lines. In this embodiment, blockage 120 formed by an accumulation of organic material (e.g., asphaltenes, hydrate, etc.) is formed in conduit 110.

Referring again to FIG. 1, during offshore operations with system 10, terminal 100 is stationary along the sea floor 5, whereas vessel 12 may move at the surface 3 relative to terminal 100. For example, vessel 12 may experience vertical heave, lateral motion, roll, pitch, yaw, or combinations thereof in response to wind, waves, and currents at the surface 3. In addition, as previously described, flexible tubing 24 is Flexi-Coil, which is pulled and propelled through riser 60, jumper assembly 70, disconnect assembly 90, terminal 100, and conduit 110 by fluid jets disposed at end 24B. In general, the lower the cumulative sum of the angles of the various bends that flexible tubing 24 navigates, the greater the total distance the fluid jets can pull flexible tubing 24. Thus, in embodiments described herein, system 10 is configured and arranged to simultaneously accommodate a limited amount of relative movement between vessel 12 and terminal 100 and minimize the cumulative sum of the angles of the bends through which flexible tubing 24 extends. Additionally, the relative flexibility of jumper 72 minimizes the reactive forces applied to the subsea terminal 100 and conduit 110. Riser 60 is linear or substantially linear and the geometry of terminal 100 and conduit 110 is generally predetermined and fixed (e.g., terminal 100 and conduit have already been installed). As a result, in embodiments described herein, the design and geometry of jumper 72 of jumper assembly 70 is specifically designed and tailored to accommodate a limited amount of relative movement between vessel 12 and terminal 100 and minimize the cumulative sum of the angles of the bends through which flexible tubing 24 extends.

Figure 3:
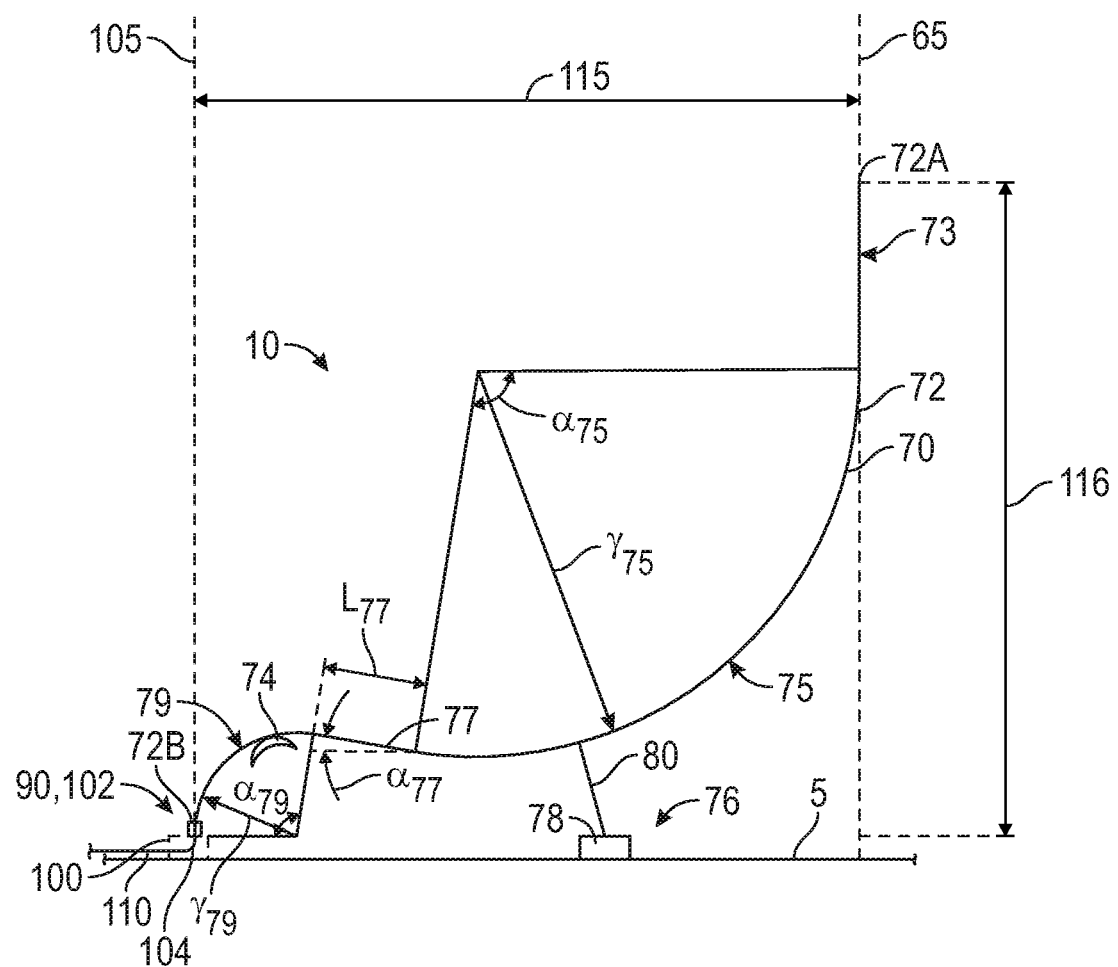
FIG. 3 is a schematic view of the flexible jumper assembly of FIG. 1.

Referring now to FIG. 3, in this embodiment, buoyancy modules 74 and weight assembly 76 induce and maintain a geometry in flexible jumper 72 that accommodates a limited amount of relative movement between vessel 12 and terminal 100 and minimizes the cumulative sum of the angles of the bends through which flexible tubing 24 extends. In In particular, buoyancy modules 74 and weight assembly 76 are laterally spaced apart to arrange flexible jumper 72 in an "S" shape or geometry. In some embodiments, jumper assembly 70 may comprise one or more bend limiters to assist in arranging jumper 72 in the "S" shape. As a result, flexible jumper 72 includes a linear (or substantially linear) section 73 extending from end 72A, a first or upper curved section 75 extending from section 73, a linear (or substantially linear) section 77 extending from upper curved section 75, and a second or lower curved section 79 extending from section 77 to end 72B. Thus, upper curved section 75 is positioned between sections 73, 77, and section 77 is positioned between curved sections 77, 79. Section 73 is vertically or substantially vertically oriented and is generally aligned with riser 60. Weight assembly 76 is coupled to upper curved section 75 proximal linear section 77, and buoyancy modules 74 are coupled to lower curved section 79 proximal linear section 77. As a result, upper curved section 75 is oriented such that its upper side is concave and its lower side is convex in side view, and lower curved section 79 is oriented such that its upper side is convex and its lower side is concave in side view. In particular, upper curved section 75 extends and curves continuously through a bend angle $\alpha_{75}$ and has a radius of curvature $r_{75}$, and lower curved section 79 extends and curves continuously through a bend angle $\alpha_{79}$ and has a radius of curvature $r_{79}$. As shown in FIG. 3, in this embodiment, radius of curvature $r_{75}$ is greater than radius of curvature $r_{79}$. Section 77 is inclined and extends upward moving from upper curved section 72 to lower curved section 79. More specifically, section 77 has a length $L_{77}$ and is oriented at an acute angle $\alpha_{77}$ relative to horizontal. A horizontal distance 115 is provided between ends 72A, 72B of jumper 72 and a vertical distance 116 is provided between ends 72A, 72B of jumper 72.

In FIG. 3, jumper 72 is shown installed in its baseline or relaxed configuration with vessel 12 at the center of its watch circle (i.e., no or substantially no lateral movement), vessel 12 at the nominal sea level (i.e., no or substantial no vertical heave), and riser 60 in a vertical orientation. In the baseline configuration of jumper 72 shown in FIG. 3, section 73 is vertically or substantially vertically oriented, bend angle $\alpha_{75}$ is about 90° to 110° and the radius of curvature $r_{75}$ is about 15.0 to 23.0 meters, length $L_{77}$ is about 3.0 to 7.0 meters and angle $\alpha_{77}$ is about 7° to 13°, bend angle $\alpha_{79}$ is about 90° to 110° and radius of curvature $r_{79}$ is about 3.0 to 7.0 meters. In addition, in the baseline configuration of jumper 72 shown in FIG. 3, horizontal distance 115 is about 21 meters (m) to less than 33 m and vertical distance 116 is about 15 m in an embodiment where jumper 72 has a length of about 45 m; however, the horizontal and vertical distances of jumper 72 in the baseline configuration may vary depending upon the configuration of jumper 72, including the length of the jumper 72. Such geometry for jumper 72 offers the potential to allow moderate movement of vessel 12 relative to terminal 100, while generally minimizing the total angle of the bends along jumper 72. It should be appreciated that as vessel 12 moves relative to terminal 100 from the center of its watch circle and/or the nominal sea level, riser 60 may move laterally, vertical orientation, rotate from vertical, or combinations thereof. Such translational and/or rotational movements by riser 60 apply vertical forces, horizontal forces, torque, or combinations thereof to upper end 72A of jumper 72. Such forces and/or torques may transition jumper 72 from the baseline configuration by altering bend angle $\alpha_{75}$, of curvature $r_{75}$, angle $\alpha_{77}$, bend angle $\alpha_{79}$, of curvature $r_{79}$, horizontal distance 115, vertical distance 116, or combinations thereof. In some embodiments, the forces applied to jumper 72 when jumper 72 is in the baseline configuration follows catenary principles. In this embodiment, jumper 72 is shown in FIG. 1 in a fully extended or offset configuration where the horizontal distance 115 is about 33 m where jumper 72 has a length of about 45 m; however, the horizontal distance 115 of jumper 72 when in the fully offset position may vary depending upon the configuration of jumper 72, including the length of jumper 72. At a sufficient degree of movement of vessel 12 relative to terminal 100, disconnect assembly 60 is configured to actuate and sever the connection formed between flexible jumper 72 and terminal 100, thereby preventing the damaging of flexible jumper 72, terminal 100, and/or other components of system 10.

As described above, intervention system 10 may be employed to perform a remediation operation to remediate or remove blockages (e.g., organic blockages, inorganic blockages, etc.) in subsea conduit 110. Particularly, following the deployment of riser 60, the connection of flexible jumper 72 with disconnect assembly 90, and the coupling of disconnect assembly 90 to accumulator skid 98, flexible tubing 24 is deployed from tubing guide assembly 26 and through riser 60. Injection fluid pump 28 pumps injection fluid from injection fluid tank 30 into flexible tubing 24. Fluid supplied to flexible tubing 24 from injection fluid pump 28 is ejected from the jet assembly at end 24B of flexible tubing 24, thereby propelling flexible tubing 24 through riser 60. As flexible tubing 24 is run into and through riser 60 and flexible jumper 72, the injection fluid preferably has a specific gravity equal to or greater than sea water to assist with advancement of flexible tubing 24 towards the sea floor 5. In this embodiment, flexible tubing 24 is run through flexible jumper 72 when jumper 72 is in the fully offset configuration shown in FIG. 1 to minimize friction between tubing 24 and jumper 72. In embodiments where flexible tubing 24 comprises wireline for lowering into a subsea wellbore, the injection fluid may comprise fluid having a specific gravity greater than sea water to assist with the lowering of the flexible tubing 24 through the subsea wellbore.

Flexible tubing 24 is advanced through flexible jumper 72, terminal 100, and into and through flowline 110 until the jet assembly at end 24B approaches and/or tags blockage 120. Upon tagging blockage 120, flexible tubing 24 may engage blockage 120 to remediate or remove blockage 120 from flowline 110. Specifically, a fluid such as brine or sea water can be pumped through flexible tubing 24 via injection fluid pump 28 and jetted against blockage 120 via with the jetting assembly at end 24B until the blockage 120 is removed from flowline 110. In addition or as an alternative, chemicals for dissolving blockage 120 can be pumped through flexible tubing 24 via injection fluid pump 28 and jetted against blockage 120 via with the jetting assembly at end 24B to break down and dissolve blockage 120. Debris removed from blockage 120, the injection fluid(s) and the process fluids (e.g., fluids within conduit 110 and terminal 100) are circulated back to vessel 12 and equipment 50 via the annulus formed between flexible tubing 24 and conduit 110, fluid conduit 104 of terminal 100, and flexible jumper 72, and annulus 64 between tubing 24 and riser 60. The process fluids and/or debris from blockage 120 may be treated or processed via process fluid system 50. Once blockage 120 has been remediated or removed, flexible tubing 24 may be retracted from flowline 110, terminal 100, flexible jumper 72, and riser 60 via the actuation of tubing guide assembly 26. Following the retrieval of flexible tubing 24, disconnect assembly 90 may be actuated to disconnect flexible jumper 72 from terminal 100, and the flexible jumper 72 and tubing string 60 may be retrieved to the surface vessel 12.

Figure 6:
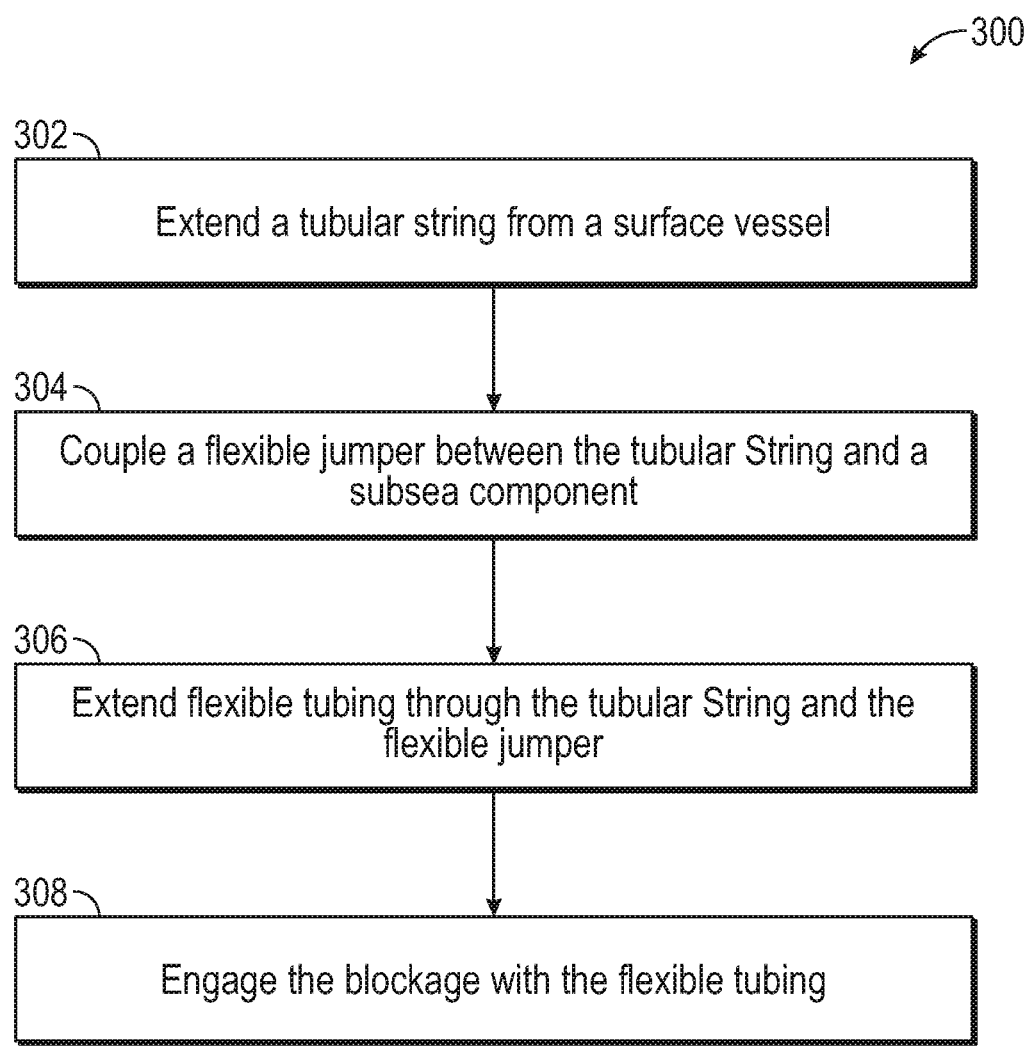
FIG. 6 is a flow chart of an embodiment of a method for remediating a blockage in a subsea conduit in accordance with principles disclosed herein.

Referring to FIG. 6, an embodiment of a method 300 for remediating a blockage in a subsea component is shown. Method 300 can be performed using system 10 described above. Beginning at block 302 of method 300, a tubular string (e.g., riser 60 is extended from a surface vessel (e.g., surface vessel 12). At block 304 of method 300, a flexible jumper (e.g., flexible jumper 72 of jumper assembly 70) is coupled between the tubular string and a subsea component (e.g., terminal 100). At block 306 of method 300, flexible tubing (e.g., flexible tubing 24) is extended through the tubular string and the flexible jumper. In some embodiments, block 306 comprises jetting fluid from a jetting assembly (e.g., jetting assembly 24B of flexible tubing 24) of the flexible tubing to propel the flexible tubing through the tubular string and the flexible jumper. At block 308 of method 300, a blockage (e.g., blockage 120) is engaged with the flexible tubing. In some embodiments, block 308 of method 300 may comprise jetting the blockage via a jetting assembly of the flexible tubing. In some embodiments, method 300 may further include actuating a disconnect assembly (e.g., disconnect assembly 60) to sever the flexible tubing and isolate the tubular string from the flexible jumper.

Figure 4:
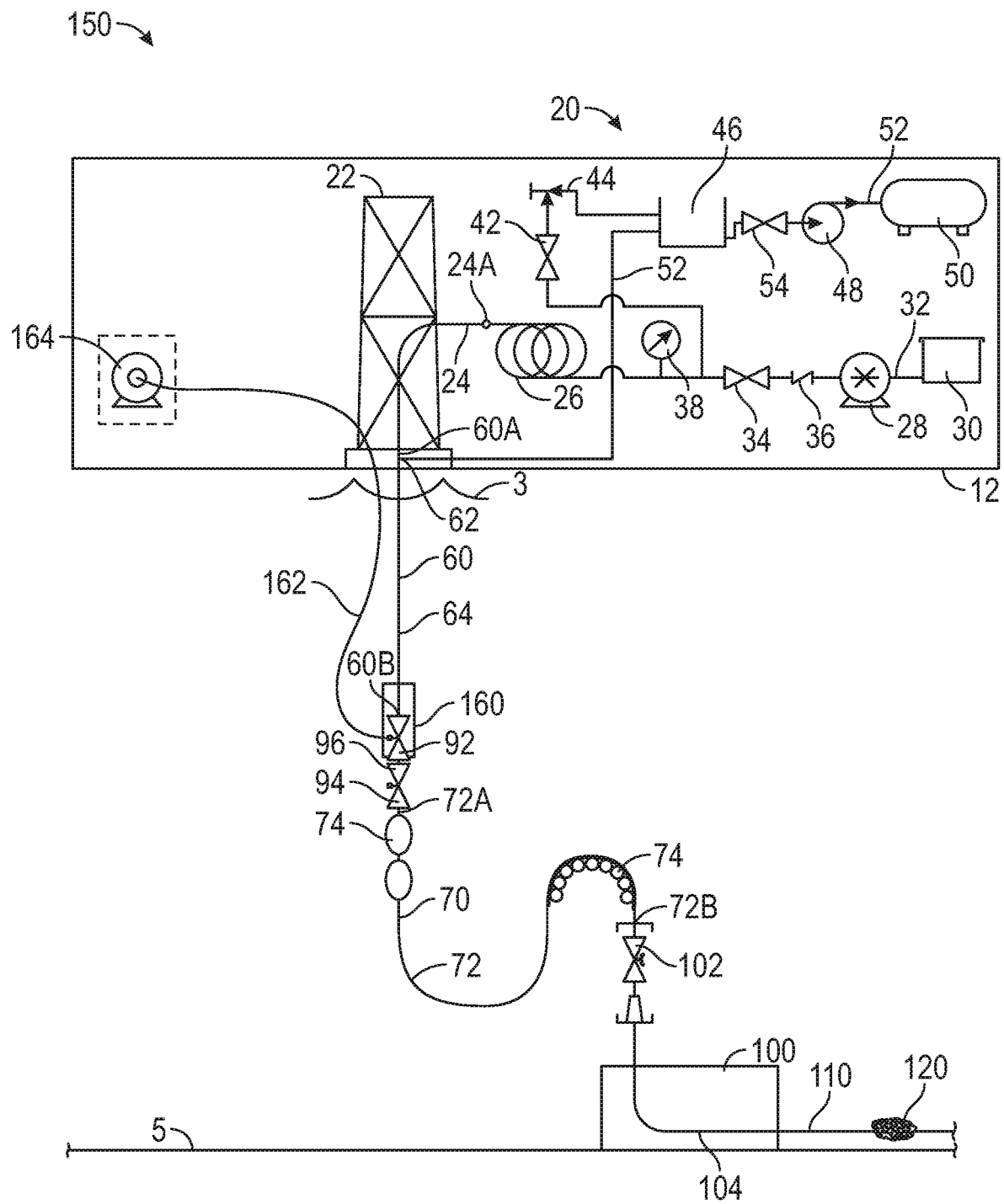
FIG. 4 is a schematic view of another embodiment of an offshore intervention system in accordance with principles disclosed herein.

In the embodiment shown in FIG. 2, the disconnect assembly 90 is positioned at the lower end 72B of jumper 72. However, in other embodiments, the disconnect assembly can be positioned at other locations. For example, referring briefly to FIG. 4, another embodiment of an offshore intervention or remediation system 150 is shown. System 150 is similar to system 10 previously described and shown in FIGS. 1-3 with the exception that a disconnect assembly 160 (e.g., EDP) is disposed at the lower end 60B of riser 60 and is coupled to the upper end 72A of jumper 72. Thus, in this embodiment, disconnect assembly 160 is positioned distal sea floor 5 with flexible jumper 72 disposed between disconnect assembly 160 and terminal 100. In addition, an umbilical 162 extends between an umbilical reel 164 positioned on the surface vessel 12 and disconnect assembly 160 for actuating valves 92, 94 and cutter 96 in response to a predetermined tensile force applied to disconnect assembly 160. Similar to disconnect assembly 90 previously described, in this embodiment, disconnect assembly 160 is a passive EDP, however, in other embodiments, disconnect assembly 160 may comprise other types of subsea disconnect assemblies known in the art.

Figure 5:
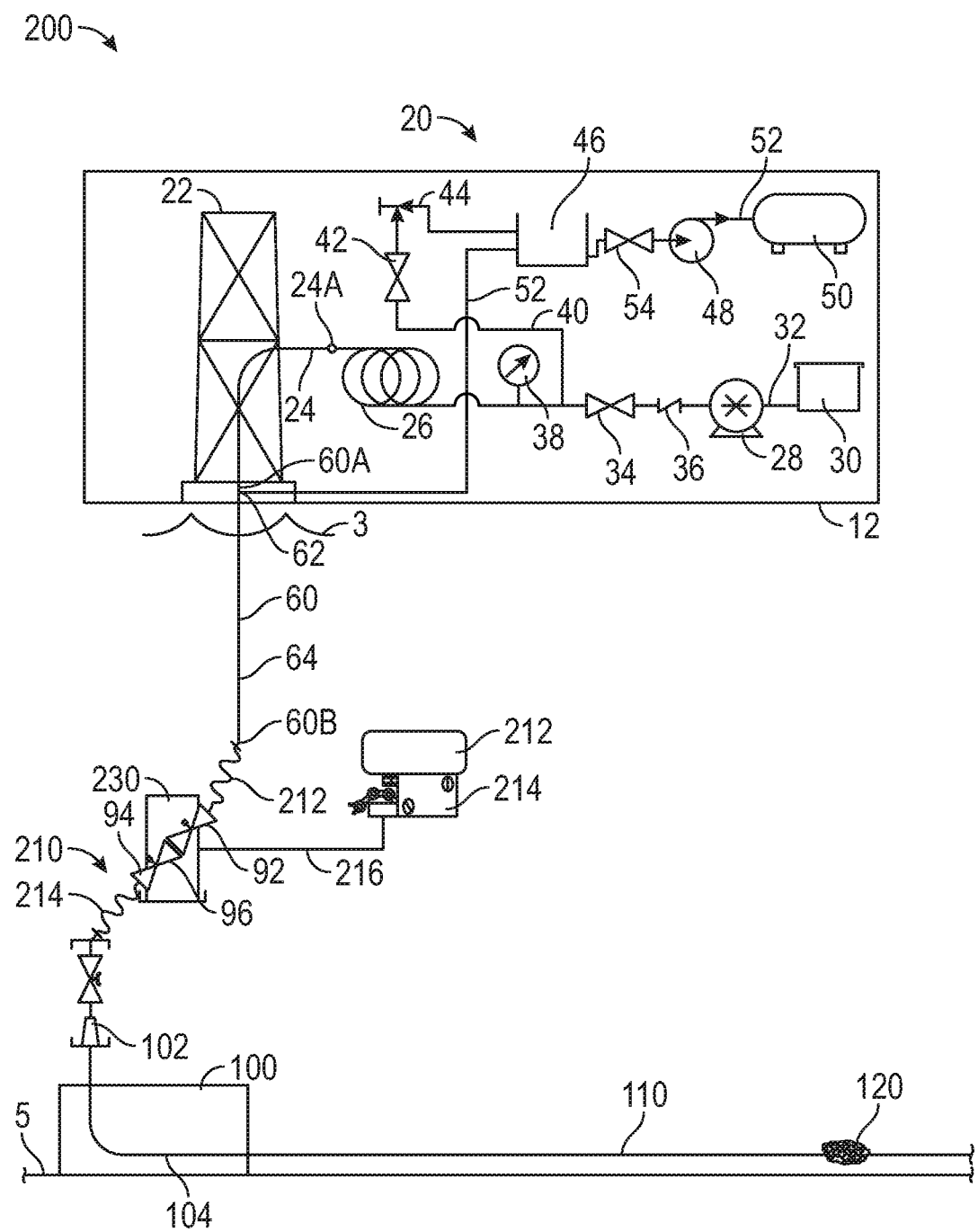
FIG. 5 is a schematic view of another embodiment of an offshore intervention system in accordance with principles disclosed herein.

As another example, an embodiment of an offshore intervention or remediation system 200 is shown in FIG. 5. In this embodiment, a disconnect assembly 230 is disposed along a flexible jumper assembly 210. Instead of being directly coupled to either riser 60 or terminal 100, disconnect assembly 230 is spaced from both riser 60 and terminal 100. In particular, jumper assembly 210 includes a first or upper flexible jumper 212 and a second or lower flexible jumper 214. Upper flexible jumper 212 is coupled to lower end 60B of riser 60 and upper valve 92 of disconnect assembly 230, and lower flexible jumper 214 is coupled to lower valve 94 of disconnect assembly 230 and the connector assembly 102 of terminal 100. Disconnect assembly 230 may include or be suspended from one or more buoyancy modules to maintain the general position of disconnect assembly 230. Valves 92, 94 and cutter 96 of disconnect assembly 90 are actuated via an accumulator assembly 212 supported by a remotely operated vehicle (ROV) 212. The accumulator assembly 212 is connected to disconnect assembly 230 via an umbilical 216 extending between ROV 214 and disconnect assembly 230. In this embodiment, disconnect assembly 230 is a passive EDP, however, in other embodiments, disconnect assembly 230 may comprise other types of subsea disconnect assemblies known in the art.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for remediating a blockage in a subsea component, the system comprising:
    a riser extending from a surface vessel;
    a flexible jumper having an upper end coupled to the riser and a lower end coupled to a subsea component disposed at a sea floor, wherein the upper end of the flexible jumper is free to travel relative to the sea floor; and
    a surface system disposed on the surface vessel and including flexible tubing configured to be inserted and advanced through the riser and the flexible jumper to the blockage, and wherein the surface system comprises an injection fluid pump configured to pump a fluid through the flexible tubing.

2. The system of claim 1, wherein the surface system comprises a tubing guide assembly coupled to the flexible tubing and configured to retract the flexible tubing from the riser.

3. The system of claim 1, further comprising a disconnect assembly coupling the lower end of the flexible jumper to the subsea component, wherein the disconnect assembly is configured to sever the flexible tubing when the flexible tubing is positioned in the disconnect assembly.

4. The system of claim 1, further comprising a buoyancy module coupled to the flexible jumper at a first location along the flexible jumper and a weight coupled to the flexible jumper at a second location along the flexible jumper, wherein the second location is laterally spaced from the first location.

5. The system of claim 4, wherein the flexible jumper is arranged in an S-shape including a first linear section extending vertically from the upper end, a first curved section extending from the linear section, a second linear section extending from the first curved section, and a second curved section extending from the second linear section.

6. The system of claim 5, wherein the first curved section has an upper side that is concave and a lower side that is convex, and wherein the second curved section has an upper side that is convex and a lower side that is concave.

7. The system of claim 6, wherein the second linear section is oriented at an acute angle relative to horizontal.

8. The system of claim 7, wherein the acute angle is 7° to 13°.

9. The system of claim 6, wherein the first curved section extends through a first bend angle of 90° to 110°, and wherein the second curved section extends through a second bend angle of 90° to 110°.

10. The system of claim 9, wherein the first curved section has a first radius of curvature and the second curved section has a second radius of curvature that is less than the first radius of curvature.

11. The system of claim 10, wherein the first radius of curvature is 15.0 meters to 23.0 meters and the second radius of curvature is 3.0 meters to 7.0 meters.

12. A system for remediating a blockage in a subsea component, the system comprising:
    a flexible jumper having an upper end coupled to a conduit extending from a surface of a body of water and a lower end coupled to a subsea terminal disposed at a sea floor;
    a buoyancy module coupled to the flexible jumper;
    a weight coupled to the flexible jumper;

wherein the flexible jumper includes a first linear section extending vertically from the upper end, a first curved section extending from the first linear section, a second linear section extending from the first curved section, and a second curved section extending from the second linear section;

wherein the weight is coupled to the first curved section proximal the second linear section and the buoyancy module is coupled to the second curved section proximal the second linear section.

13. The system of claim 12, wherein the first curved section has an upper side that is concave and a lower side that is convex, and wherein the second curved section has an upper side that is convex and a lower side that is concave.

14. The system of claim 13, wherein the second linear section is oriented at an acute angle relative to horizontal.

15. The system of claim 14, wherein the acute angle is 7° to 13°.

16. The system of claim 13, wherein the first curved section extends through a first bend angle of 90° to 110°, and wherein the second curved section extends through a second bend angle of 90° to 110°.

17. The system of claim 16, wherein the first curved section has a first radius of curvature and the second curved section has a second radius of curvature that is less than the first radius of curvature.

18. The system of claim 17, wherein the first radius of curvature is 15.0 meters to 23.0 meters and the second radius of curvature is 3.0 meters to 7.0 meters.

19. The system of claim 12, wherein the weight is coupled to the flexible jumper by a tension cable extending between the weight and the first curved section of the flexible jumper.

20. A method for remediating a blockage in a subsea component, the method comprising:
(a) suspending a riser from a surface vessel;
(b) coupling an upper end of a flexible jumper to a lower end of the riser;
(c) coupling a lower end of the flexible jumper to the subsea component disposed at a sea floor, wherein the upper end of the flexible jumper is free to travel relative to the sea floor;
(d) advancing a flexible tubing from the surface vessel through the riser and the flexible jumper;
(e) pumping an injection fluid into a first end of the flexible tubing on the surface vessel and flowing the injection fluid through the flexible tubing; and
(f) ejecting the injection fluid from a second end of the flexible tubing proximal the blockage to remove the blockage.

21. The method of claim 20, wherein (f) comprises jetting the blockage with the injection fluid to break up the blockage.

22. The method of claim 20, wherein (f) comprises dissolving the blockage with the injection fluid.

23. The method of claim 20, further comprising:
coupling a buoyancy module to the flexible jumper and coupling a weight to the flexible jumper to arrange the flexible jumper in an S-shape.

24. The method of claim 23, wherein the buoyancy module is coupled to the flexible jumper at a first location and the weight is coupled to the flexible jumper at a second location that is laterally spaced from the first location.

25. The method of claim 20, wherein the flexible jumper includes a first linear section extending vertically from the upper end, a first curved section extending from the linear section, a second linear section extending from the first curved section, and a second curved section extending from the second linear section;

wherein the first curved section has an upper side that is concave and a lower side that is convex, and wherein the second curved section has an upper side that is convex and a lower side that is concave.

26. The method of claim 25, wherein the second linear section is oriented at an acute angle relative to horizontal.

27. The method of claim 26, wherein the acute angle is 7° to 13°.

28. The method of claim 25, wherein the first curved section extends through a first bend angle of 90° to 110°, and wherein the second curved section extends through a second bend angle of 90° to 110°.

29. The method of claim 28, wherein the first curved section has a first radius of curvature and the second curved section has a second radius of curvature that is less than the first radius of curvature.

30. The method of claim 29, wherein the first radius of curvature is 15.0 meters to 23.0 meters and the second radius of curvature is 3.0 meters to 7.0 meters.

* * * * *